C. WEAVER.
ELASTIC ARMBAND.
APPLICATION FILED OCT. 9, 1913.
1,171,993.
Patented Feb. 15, 1916.
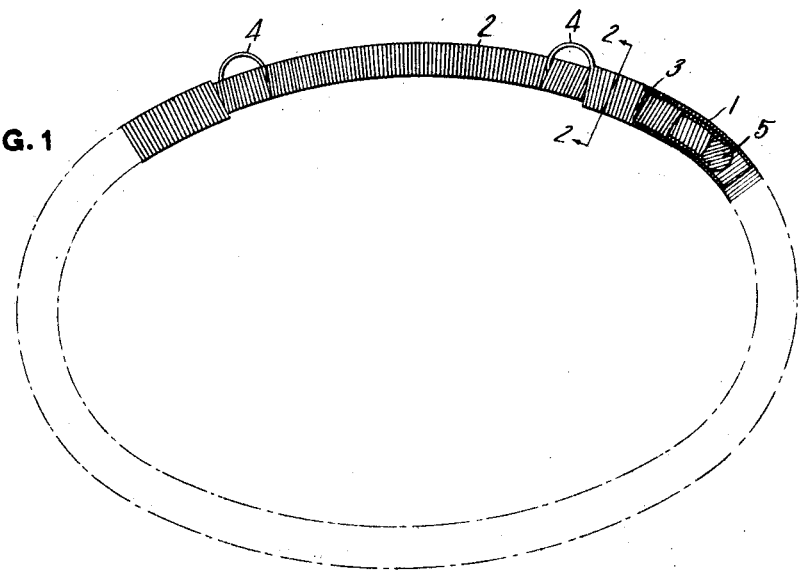

UNITED STATES PATENT OFFICE.

CARTTER WEAVER, OF PITTSBURGH, PENNSYLVANIA, ASSIGNOR TO WEAVER PRODUCTS MANUFACTURING COMPANY, OF PITTSBURGH, PENNSYLVANIA, A CORPORATION OF DELAWARE.

ELASTIC ARMBAND.

1,171,993.

Specification of Letters Patent.

Patented Feb. 15, 1916.

Application filed October 9, 1913. Serial No. 794,320.

*To all whom it may concern:*

Be it known that I, CARTTER WEAVER, a resident of Pittsburgh, in the county of Allegheny and State of Pennsylvania, have invented a new and useful Improvement in Elastic Armbands, of which the following is a specification.

This invention relates to elastic bands or supports and particularly to such as are used for sleeve bands, garters, hose supporters, bracelets and the like, or for gathering the bottoms of pants, sleeves etc.

The object of the invention is to provide a simple and durable band, which is very flexible and elastic in all directions, which has simple fastening or locking means and may be easily and quickly adjusted to different sizes, and which can be manufactured at low cost.

The invention comprises the construction and arrangement of parts hereinafter described and claimed.

In the drawings Figure 1 represents an elevation of one form of band; Fig. 2 is a cross section thereof on the line 2—2, Fig. 1, looking in the direction of the arrows; Fig. 3 is a detail sectional elevation at one end of the joints; Fig. 4 is a detail side elevation at one of the joints, and showing the same unfastened; Fig. 5 is a similar view illustrating how the joint is fastened; Fig. 6 is a view similar to Fig. 1, on a reduced scale, and showing a modification; Fig. 7 is a cross sectional view on the line 7—7, Fig. 6; Fig. 8 is a detail sectional view illustrating a modification, and Fig. 9 is a broken out elevation showing the invention applied to a garment.

The elastic band shown in the drawings is formed of a plurality of outer members 1 and inner members 2, so arranged as to telescope or slide into each other. Said members may be flat or oval in cross section, as shown in Fig. 7, so as to lie flat on the limb, but preferably are round in cross section, as shown in Fig. 2. Any even number of members may be used, for example, four, six or eight, four being shown in Fig. 6, but only two sections are preferred, as shown in Fig. 1, as the number of joints is thereby reduced.

Each member 1, 2, is a hollow structure of strong spring wire, such as steel piano wire, coiled or bent into helical or spiral form, with successive turns of the wire practically abutting or contacting with each other when the band is relaxed, as shown at 3, Fig. 1.

The outer members 1 have a slightly greater internal diameter than the external diameter of the inner members 2, so the latter will readily slide or telescope into or out of the outer or larger members, irrespective of any curved form the band may assume. Furthermore, the wires of the members 1 and 2 are preferably coiled in opposite directions around the axis of the helix, so that where portions of the members telescope each other the wires of the two members lie at a greater angle to each other and more readily slide past each other. In the particular form shown in Fig. 1 member 1 is a right hand spiral while member 2 is a left hand spiral, although the reverse arrangement may be used.

Each of the members 1 and 2 may be of any suitable length, but preferably all are of about the same length, and in the form shown in Fig. 1 member 1 is a little shorter than the circumference of the smallest size of the band.

At each open end of the outer member 1, the end portion of the wire is bent out of the symmetrical contour of the spiral and into a plane extending longitudinally of the spiral, and a little to one side of the axis thereof, thereby forming a hook or catch 4 whose end is passed between adjacent turns of the wire of the inner member 2 as shown in Fig. 3, to lock or fasten the telescoping members together. The band is adjusted by taking hold of the hook 4 with the fingers and lifting it out from the inner member 2 into a position at one side thereof, as shown in Fig. 4. This frees the two members from each other, and the smaller member may be moved into or out of the larger member until the band is of the proper size. The coils of the large member are then gripped or pinched with the fingers of one hand near said hook with enough force to prevent the inner member from sliding therein, while with the other hand the exposed portion of the inner or smaller member is stretched, as shown in Fig. 5, thereby separating its coils, and allowing the free end of the hook 4 to pass therebetween. The two members may be adjusted in this manner at each and every joint, that is, at four different points when four members are used, as in Fig. 6, and at two points when two members are used, as in Fig. 1.

If desired, each opposite end portion of the smaller inner member may be provided with a knob or head, shown in Fig. 3 as a small rivet 5 with a short shank, and in Fig. 8 as a ball 5ª. This head is soldered, welded or otherwise secured to the end coils of the inner member and has its outer diameter substantially the same as the outer diameter of the inner member. The round head enables the inner coil to be inserted into or adjusted in the outer member with greater freedom and prevents the coils from catching on each other.

The wire structures, of both sizes, may be made in very long pieces and then cut into sections of the proper length, enabling them to be cheaply manufactured in large quantities. After the sections are cut to length, the end portions of the larger spiral are bent to form the hooks 4 and the ends of the small spiral are then telescoped into the large spiral, and the hooks 4 engaged therein. The band is readily adjusted and is of very simple construction, and is therefore durable and not liable to get out of order. It may be used as a sleeve, band or garter, and if desired, may have secured thereto a suitable clasp to enable it to be used as a hose supporter. It may also be plated with gold, silver or the like and used as a bracelet or ornament.

The device may also be used as an elastic for wearing apparel, such as for coat collars, sleeves, pant legs, etc. In Fig. 9, 10 indicates the lower portion of a pants leg. The edge of the material is folded or turned back on itself, and stitched, as at 11, to form a hem 12, in which the elastic band before described is placed. The band is easily inserted, and by leaving an opening 13 into the hem it may be easily adjusted to vary the tension.

What I claim is:

1. An elastic band for personal wear, comprising a plurality of hollow wire members of different diameters, each smaller member telescoping at each end into a larger member, and each larger member being provided at each end with means for detachably securing a smaller member thereto.

2. An elastic band for personal wear, comprising two elastic members, the opposite ends of one of said members telescoping into the opposite ends of the other members, and means at the ends of the outer of said members for detachably securing the inner member thereto.

3. An elastic band for personal wear, comprising outer and inner wire members, the inner member being telescoped into the outer member, the end portion of the wire of the outer member being bent to form a hook and adapted to be passed between any two successive turns of the wire of the inner member.

4. An elastic band for personal wear, comprising a hollow wire structure having two end portions of different sizes, one telescoping into the other, the free end of the wire at one end of the larger portion being bent to form a hook and adapted to be passed from the outside between any two successive turns of the wire of the smaller portion of the structure to adjustably secure together the ends of the wire structure.

5. An elastic band for personal wear, comprising a plurality of wire coils of different sizes telescoped into each other, and means for detachably securing said coils to each other, said coils being wound in opposite directions whereby they will slide easily past each other.

6. An elastic band for personal wear, comprising an outer coil, an inner coil telescoping thereinto, and means for securing said coils in adjusted position, the inner coil being provided with a head for preventing the coils from catching in each other.

In testimony whereof, I have hereunto set my hand.

CARTTER WEAVER.

Witnesses:
ELBERT L. HYDE,
WILLIAM B. WHARTON.